United States Patent
Vaughan et al.

[11] Patent Number: 5,923,843
[45] Date of Patent: *Jul. 13, 1999

[54] METHOD AND APPARATUS FOR OVERRIDING ACCESS SECURITY TO A PC WHEN A PASSWORD IS LOST

[75] Inventors: Mark P. Vaughan, Spring; Derrill L. Sturgeon, Houston, both of Tex.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/829,240

[22] Filed: Mar. 31, 1997

[51] Int. Cl.⁶ .................................................... G06F 13/00
[52] U.S. Cl. ............................................ 395/188.01; 380/3
[58] Field of Search .............................. 395/188.01, 186; 364/479.07; 380/24, 3

[56] References Cited

U.S. PATENT DOCUMENTS

| | | | |
|---|---|---|---|
| 3,984,637 | 10/1976 | Caudill et al. ......................... | 179/20 P |
| 4,604,708 | 8/1986 | Lewis ..................................... | 364/900 |
| 4,733,345 | 3/1988 | Anderson ................................ | 380/25 |
| 4,814,972 | 3/1989 | Winter et al. .......................... | 364/200 |
| 4,879,747 | 11/1989 | Leighton et al. ....................... | 380/23 |
| 5,091,939 | 2/1992 | Cole et al. .............................. | 380/25 |
| 5,198,806 | 3/1993 | Lord ..................................... | 340/825.31 |
| 5,210,795 | 5/1993 | Lipner et al. ........................... | 380/23 |
| 5,212,729 | 5/1993 | Schafer ................................... | 380/4 |
| 5,226,080 | 7/1993 | Cole et al. .............................. | 380/25 |
| 5,253,341 | 10/1993 | Rozmanith et al. .................... | 395/200 |
| 5,313,639 | 5/1994 | Chao ...................................... | 395/725 |
| 5,355,413 | 10/1994 | Ohno ...................................... | 380/24 |
| 5,375,243 | 12/1994 | Parzych et al. ......................... | 395/725 |
| 5,537,544 | 7/1996 | Morisawa et al. ..................... | 395/188.01 |
| 5,544,083 | 8/1996 | Iizuka et al. ........................... | 364/709.01 |
| 5,544,246 | 8/1996 | Mandelbaum et al. ................. | 380/23 |
| 5,664,097 | 9/1997 | Johnson et al. ........................ | 395/186 |
| 5,694,549 | 12/1997 | Carlin et al. ........................... | 395/200 |

FOREIGN PATENT DOCUMENTS 2100631  2/1994  Canada.

*Primary Examiner*—Robert W. Beausoliel, Jr.
*Assistant Examiner*—Norman Michael Wright
*Attorney, Agent, or Firm*—Jenkens & Gilchrist

[57] ABSTRACT

A system for overriding access security in a computing device including a local security device and an input device. Access security is overridden when a medium containing override passcode information is inserted into an input device and the local security device reads and verifies the override passcode information. Alternatively, a second, remotely located security device reads and verifies the override passcode information, and if valid, authorizes the local security device to override access security.

6 Claims, 2 Drawing Sheets

METHOD AND APPARATUS FOR OVERRIDING ACCESS SECURITY TO A PC WHEN A PASSWORD IS LOST

FIELD OF THE INVENTION

The present invention relates in general to access security for personal computers, and more particularly, but not by way of limitation, to a method and apparatus for overriding access security to a television/personal computer (TV/PC) convergence device when passcode information has been forgotten or set to an unknown value.

BACKGROUND OF THE INVENTION

Computing devices are generally equipped with access security functionality whereby access to the computing device is restricted to select users through the use of passcode information. The passcode information is initially selected by the user, and then subsequently provided by the user whenever access to the computing device is desired. Situations may arise, however, where the user forgets the passcode information or inadvertently changes the passcode information to an unknown value. In a corporate or similar environment where access security is provided over a network and computer support is readily available, access to the computer is usually easily regained. In a standalone environment, however, regaining access to the computer can be difficult and time consuming. Although the present invention is equally applicable to any computing device, a TV/PC convergence device is described by way of example since it illustrates a situation where a standalone system requires access security using passcode information that may be forgotten or inadvertently changed.

A TV/PC convergence device is a fully functional computer integrated with a television (TV) functionality providing TV viewing (via broadcast, cable, digital satellite, video cassette recorder, laser disk, or other broadcast media) and personal computing functionality. Convergence of computer and television provides a user with combined access to television program information, computer information, and Internet information.

Since the TV/PC convergence device is controlled by the computer's operating system, the TV/PC convergence device can, among other things, display personal computer (PC) applications and TV programs on a single monitor. The convergence of the personal computer and the television into a single device also permits the utilization of the communications bandwidth, mass storage, and graphics of the computer to deliver, store, and display applications during a traditional television viewing environment.

The TV/PC convergence device is a user interactive device. For example, if a user is watching a television program, the TV/PC convergence device enables the user to download information about that particular program, such as from a web site where additional information about or related to the program might be located.

Unlike most home computers which are usually used by a single user in a somewhat private area of the home such as a study, the TV/PC convergence device is intended to be used by all members of the family, and therefore, is used in a more public area of the home such as the family room and living room. This means that the TV/PC device is also accessible to neighbors, friends, and other guests in the home. Unlike a regular television, the TV/PC convergence device, which includes a computer, often has files containing important and confidential data which a user may not want anyone else to view or corrupt. Therefore, it is very important that a user be able to restrict others from using at least a portion of the computer in the TV/PC convergence device while still allowing access to the TV mode of operation.

SUMMARY OF THE INVENTION

The present invention allows a user to regain access to a TV/PC or other computing device in the event that user selected passcode information is forgotten or inadvertently changed to an unknown value by providing the user with a mechanism to enter access security override passcode information. To effectuate the override mechanism of the present invention while still restricting access to authorized users, the present invention provides that such override passcode information be resident on a medium used by a data input device connected to the computing device and that the medium be read by the security device to obtain the override passcode information. For example, the override passcode information may be resident on a compact disk and a compact disk drive is used to input the override passcode information. In such a case, the user can retain physical possession of the medium containing the override passcode information in a manner akin to having a master key which can be used when a custom key is lost.

The present invention further provides that the override passcode information can either reside in a read/write file on the medium or, to provide greater security, can reside on a portion of the medium which is static and less easily duplicated. For example, if the data input device is a compact disk drive, the volume label used to identify a system compact disk included with the computing device from the manufacturer can be used as the override passcode information.

The present invention still further provides for a second remote security device which receives the override passcode information, verifies its validity, and provides authorization to the local security device to allow user access to the computing device.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

Figure 1:
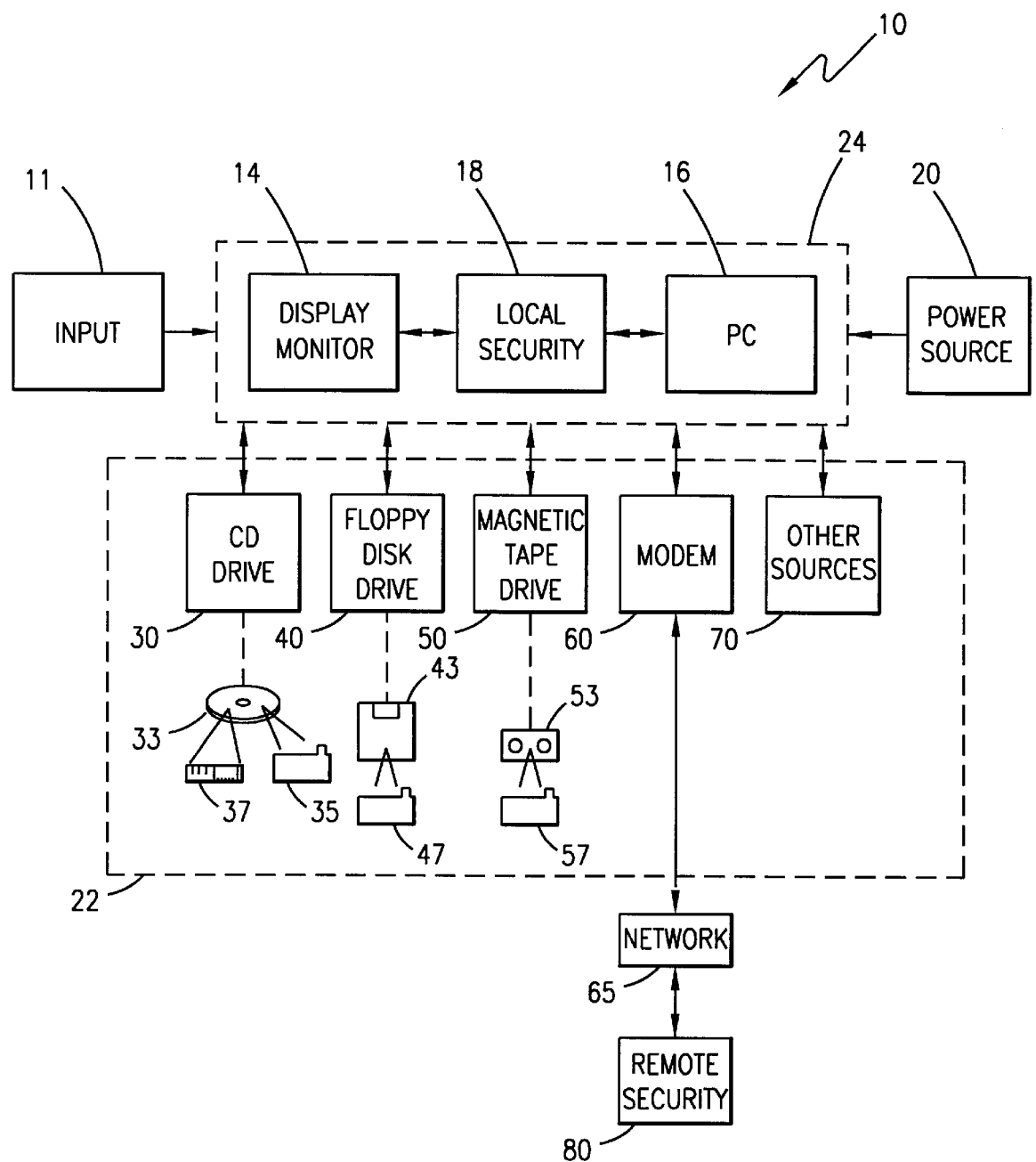
FIG. 1 is a block diagram illustrating a system utilizing the present invention.

With reference now to the figures wherein like or similar elements are designated with identical reference numerals, there are depicted flow and block diagrams of TV/PC systems in accordance with the method and system of the present invention. The purpose of these diagrams is to illustrate the features of the invention and the basic principles of operation thereof. These diagrams are not necessarily intended to schematically represent particular modules of circuitry or any particular data or control paths.

Referring now to FIG. 1, there is shown a block diagram illustrating a TV/PC convergence system 10. TV/PC convergence system 10 includes a user input device 11, a display monitor 14, a personal computer (PC) 16, a local security device 18, a power source 20 and several TV/video/data sources 22. Display monitor 14, PC 16, and local security device 18 are coupled to form a TV/PC convergence device 24. The TV/video/data sources 22 may include a compact disk (CD) drive 30, a floppy disk drive 40, a magnetic tape drive 50, a modem 60, and various other sources 70. The various other sources 70 may include, but are not limited to, such devices as a video cassette recorder, an audio tape player, a digital audio tape player, a digital video disk player, or a laser video disk player. The CD drive 30 accesses information on a CD 33 including CD files 35 and a volume label 37 which identifies the system CD associated with the TV/PC convergence device 24. The floppy disk drive 40 accesses information on a floppy disk 43 including floppy disk files 47. The magnetic tape drive 50 accesses information on a magnetic tape 53 including magnetic tape files 57. The modem 60 accesses a remote security device 80 via a network 65.

The TV/PC convergence device 24 is powered from power source 20 and can be operated in a variety of modes including a TV mode or a PC mode. Access to the TV/PC convergence device 24 and its various operating modes can be restricted through the use of the local security device 18. When the TV/PC convergence device 24 is activated and access security is enabled, the TV/PC convergence device 24 is in a secured mode. In such a situation, a user must enter passcode information through the user input device 11 to the local security device 18 which verifies the validity of the information to allow user access. If the passcode information is forgotten or changed to an unknown value, the user is continually denied access and a mechanism is needed to regain access.

The present invention allows access to the TV/PC convergence device 24 through the use of override passcode information. Such information is included with the TV/PC convergence device 24 from the manufacturer or can be created by the user upon first activation of the local security device 18. In either event, a first copy of the override passcode information is retained by the local security device 18 and a second copy of the information is written to a floppy disk file 47, a magnetic tape file 57, or a CD file 35. Alternatively, the override passcode information can be included on the media used by the various other devices 70. These files are easily duplicated, however, and allow for multiple copies of the override passcode information to be created. To provide a greater degree of security, the override passcode information can be set by the manufacturer of the TV/PC convergence device 24 to be the volume label 37 identifying the system CD sent with the TV/PC convergence device 24. The volume label 37 is not as easily duplicated and thus provides somewhat greater security.

To activate the override mechanism of the present invention, the local security device 18 is programmed to allow the user, when the local security device 18 is in the secured mode, to request that the local security device 18 enter an override mode. Upon entering the override mode, the user is either instructed to place the medium containing the override passcode information in the corresponding input device, or alternatively, is allowed to select which input device is to be used to enter the override passcode information. The local security device 18 then reads the override passcode information and verifies that it is valid by comparing it to the copy retained in the local security device 18. If the override passcode information is valid, the local security device 18 enters an unsecured mode and allows the user access to the TV/PC convergence device 24. Otherwise, access is denied and the local security device 18 returns to the secured mode. Since the user is required to place the physical medium into the input device, override capability is limited to users having physical access to the medium.

In an alternative embodiment, the remote security device 80 is provided with a copy of the override passcode information and preforms the validation process. The local security device 18, after entering the override mode and instructing the user to place the medium containing the override passcode information in the input device, accesses the remote security device 80 via the modem 60 and network 65 and relinquishes control of the override procedure to the remote security device 80. The remote security device 80 reads the override passcode information and verifies that it is valid by comparing it to its copy. If the override passcode information is valid, the remote security device 80 provides the local security device 18 authorization to allow the user access to the TV/PC convergence device 24 and the local security device 18 enters the unsecured mode. Otherwise, access is denied and the local security device 18 returns to the secured mode.

Figure 2:
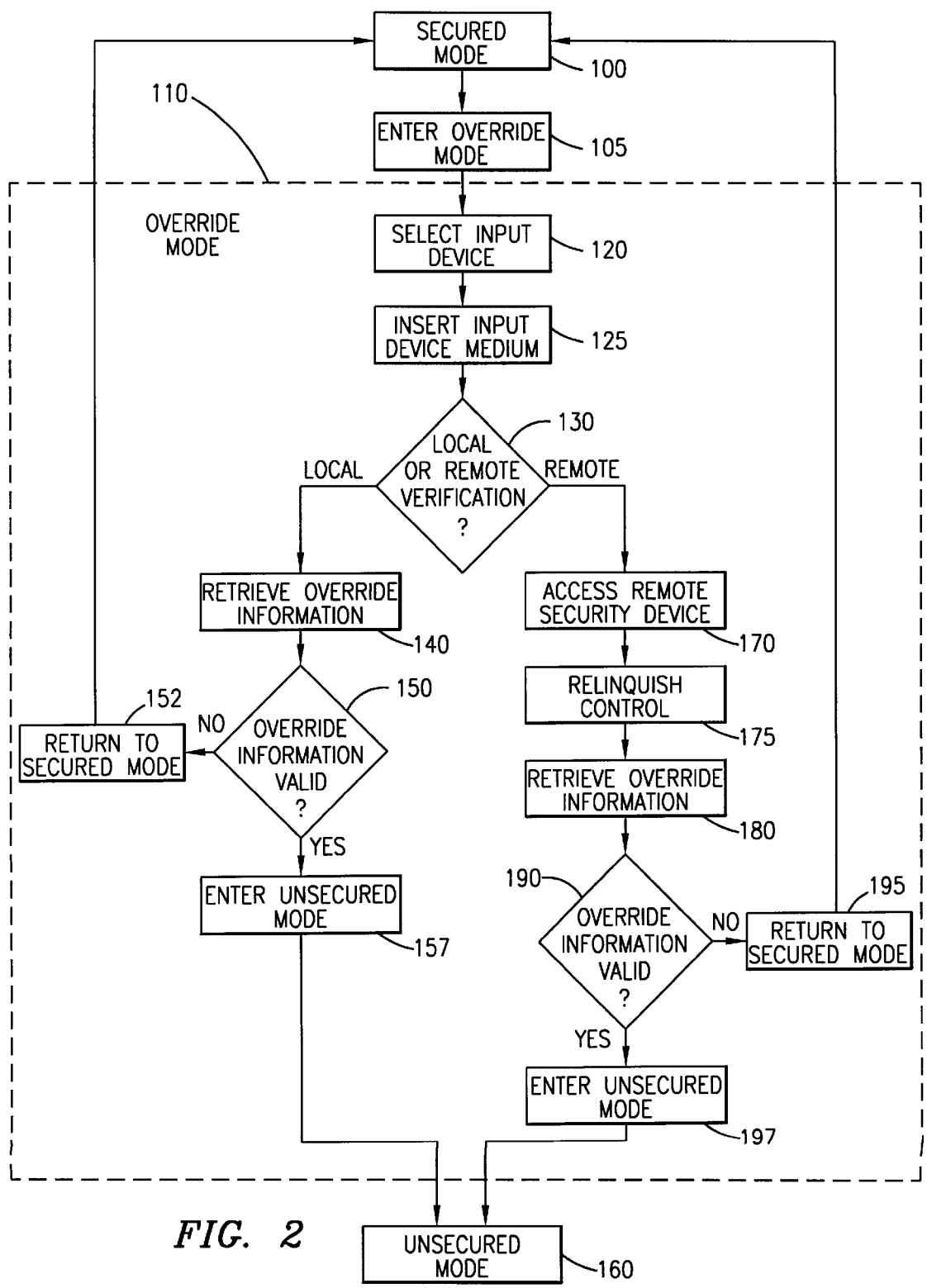
FIG. 2 is a flow diagram of a method for implementing the present invention.

Referring additionally now to FIG. 2, there is illustrated a flow diagram of a method of the present invention for overriding access security. When a user desires to override the access security of the TV/PC convergence device 24, the local security device is typically in the secured mode 100, and therefore, the user does not have access to the TV/PC convergence device 24. To regain access, the user enters a predefined command sequence to the local security device 18 which has been programmed to enter into an override mode 110 in response to entry of the predefined command sequence (step 105).

Upon entering the override mode 110, the local security device 18, instructs the user to enter the medium containing the override passcode information into the input device (step 120). The selected input device can either be preset to a specific input device or the local security device 18 can allow the user to select the input device. The user then enters the medium into the input device (step 125) and the local security device 18 determines whether verification of the override passcode information is to be preformed by the local security device 18 or by the remote security device 80 (step 130). If verification is to be preformed locally, the local security device 18 retrieves the override passcode information (step 140) and compares the override passcode information provided by the input device with the copy contained in the local security device 18 to determine the validity of the information (step 150). If the override passcode information is invalid, the local security device returns to the secured mode 100 (step 152). On the other hand, if the override passcode information is valid, the local security device 18 enters an unsecured mode 160 (step 157) and the user is allowed access to the TV/PC convergence device 24.

If in step 130 the local security device 18 determines that verification of the override passcode information is to be preformed by the remote security device 80, the local security device 18 accesses the remote security device 80 (step 170) and relinquishes control (step 175) to the remote security device 80. The remote security device 80 retrieves the override passcode information (step 180) and compares the override passcode information provided by the input device with its copy to determine the validity of the override passcode information (step 190). If the override passcode information is invalid, the remote security device 80 instructs the local security 18 to return to the secured mode 100 (step 195). On the other hand, if the override passcode information is valid, the remote security device 80 instructs the local security device 18 to enter the unsecured mode 160 (step 197) and the user is allowed access to the TV/PC convergence device 24.

Although the preferred embodiments of the apparatus and method of the present invention have been illustrated in the accompanying Drawings and described in the foregoing Detailed Description, it will be understood that the invention is not limited to the embodiments disclosed, but is capable of numerous rearrangements, modifications and substitutions without departing form the spirit of the invention as set forth and defined by the following claims. For example, while a TV/PC convergence device has been described herein in detail, the teachings of the present invention can be applied to any type of convergence device (such as a PC/game system), as well as to many other types of "intelligent" consumer electronics devices.

What is claimed is:

1. A computer system comprising:

a local computing system for executing programs;

a local security device for selectively allowing access to full functionality of the local computing system by switching from a secured mode to an unsecured mode in response to a locally entered password or receipt of a remotely provided override authorization, the local security device further for allowing access to limited functionality of the local computing system by switching from a secured mode to an override mode in response to an override command sequence inputted into the local computing device for the purpose of entering override passcode information used to obtain the remotely provided override authorization;

a remote security device for providing the override authorization to the local security device in response to locally entered override passcode information, the remote security device being remotely located from the local computing system and the local security device;

a local data input device for entering the override passcode information; and a modem for effectuating communication between the remote security device and both the local security device and the local data input device, the modem communicating the locally entered passcode information from the local computing system to the remote security device, and the modem further communicating the remotely provided override authorization from the remote security device to the local security device.

2. The computer system as recited in claim 1, wherein the local data input device is a floppy disk drive.

3. The computer system as recited in claim 1, wherein the local data input device is a magnetic tape drive.

4. The computer system as recited in claim 1, wherein the local data input device is a compact disk drive.

5. The computer system as recited in claim 1, wherein the computing device is a TV/PC convergence device.

6. A method for overriding access security in a local computer system comprising the steps of:

inputting an override command sequence into the local computer system;

entering into an override mode of the local computer system in response to the inputting of the override command sequence;

inputting override passcode information into the local computer system;

automatically establishing communication between the local computer system and a security device located remotely from the local computer system;

automatically communicating the override passcode information from the local computer system to the security device located remotely from the local computer system;

relinquishing control of the local computer system to the security device located remotely from the local computer system;

verifying, by the security device located remotely from the local computer system, that the override passcode information is valid;

instructing the local computer system to enter into an unsecured mode thereby allowing access by the user to full functionality of the local computer system in response to valid override passcode information; and entering into the unsecured mode in response to the instruction to enter into the unsecured mode.

* * * * *